United States Patent
Kříž et al.

(10) Patent No.: US 10,686,813 B2
(45) Date of Patent: Jun. 16, 2020

(54) METHODS OF DETERMINING A FILE SIMILARITY FINGERPRINT

(71) Applicant: Avast Software s.r.o., Prague (CZ)

(72) Inventors: Antonín Kříž, Prachatice (CZ); Libor Mořkovský, Křemže (CZ)

(73) Assignee: Avast Software s.r.o., Prague (CZ)

( * ) Notice: Subject to any disclaimer, the term of this patent is extended or adjusted under 35 U.S.C. 154(b) by 481 days.

(21) Appl. No.: 15/468,769

(22) Filed: Mar. 24, 2017

(65) Prior Publication Data

US 2017/0279841 A1     Sep. 28, 2017

Related U.S. Application Data

(60) Provisional application No. 62/313,597, filed on Mar. 25, 2016.

(51) Int. Cl.
    *H04L 29/06* (2006.01)

(52) U.S. Cl.
    CPC ........ *H04L 63/1425* (2013.01); *H04L 63/145* (2013.01); *H04L 63/1416* (2013.01)

(58) Field of Classification Search
    CPC .......... H04L 63/1425; H04L 63/145; H04L 63/1416
    USPC ......................................................... 726/23
    See application file for complete search history.

(56) References Cited

U.S. PATENT DOCUMENTS

| 2016/0103831 | A1* | 4/2016 | Khattar | G06F 16/35 707/747 |
| 2016/0267270 | A1* | 9/2016 | Lee | H04L 63/145 |
| 2017/0344579 | A1* | 11/2017 | Basireddy | G06F 16/174 |

OTHER PUBLICATIONS

Properties of Embedding Methods for Similarity Searching in Metric Spaces Gi sli R. Hjaltason, Member, IEEE Computer Society, and Hanan Samet, Fellow, IEEE (Year: 2003).*
Studies in Fuzziness and Soft Computing Feature Extraction Foundations and Applications: Chapter 3 Filter methods. pp. 167-185 Włodzisław Duch (Year: 2006).*
Ssdeep—Latest version 2.13, http://ssdeep.sourceforge.net/, Accessed Jun. 19, 2017.
Sdhash home, http:roussev.net/sdhash.html, Accessed Jun. 19, 2017.

* cited by examiner

*Primary Examiner* — Kambiz Zand
*Assistant Examiner* — Benjamin A Kaplan
(74) *Attorney, Agent, or Firm* — Erickson Kernell IP, LLC

(57) ABSTRACT

A similarity fingerprint for a data object such as a file can be automatically determined using one or more anchor values. The one or more anchor values can be provided or determined. For each anchor value, a set of distances between each instance of the anchor value in the data object is determined. The set of distances for the instance of the anchor value is aggregated into a single value. The single value is added as a component of the similarity fingerprint. Thus, if there are N anchor values, there can be N components of the similarity fingerprint. The similarity fingerprints of different data objects can be compared and the results of the comparison can be used to determine how similar the data objects are.

20 Claims, 4 Drawing Sheets

METHODS OF DETERMINING A FILE SIMILARITY FINGERPRINT

CROSS-REFERENCE TO RELATED APPLICATIONS

This application claims priority from U.S. provisional application Ser. No. 62/313,597, filed Mar. 25, 2016 which is hereby incorporated by reference in its entirety.

FIELD

The disclosure relates generally to determining file similarity, and more particularly, to systems and methods for determining a file fingerprint for use in determining file similarity.

BACKGROUND

There are many occasions where it is desirable to determine if one file is similar to another file or if one data object is similar to another data object. For example, in the field of malware detection, it can be useful to determine if a file or a portion of a file is similar to a file that is known to contain malware, or is known to be free of malware. Other applications include determining similarity of object code libraries or executable files, or determining similarity of event logs.

BRIEF DESCRIPTION OF THE DRAWINGS

For a better understanding of the inventive subject matter, reference may be made to the accompanying drawings in which.

DETAILED DESCRIPTION

Figure 1:
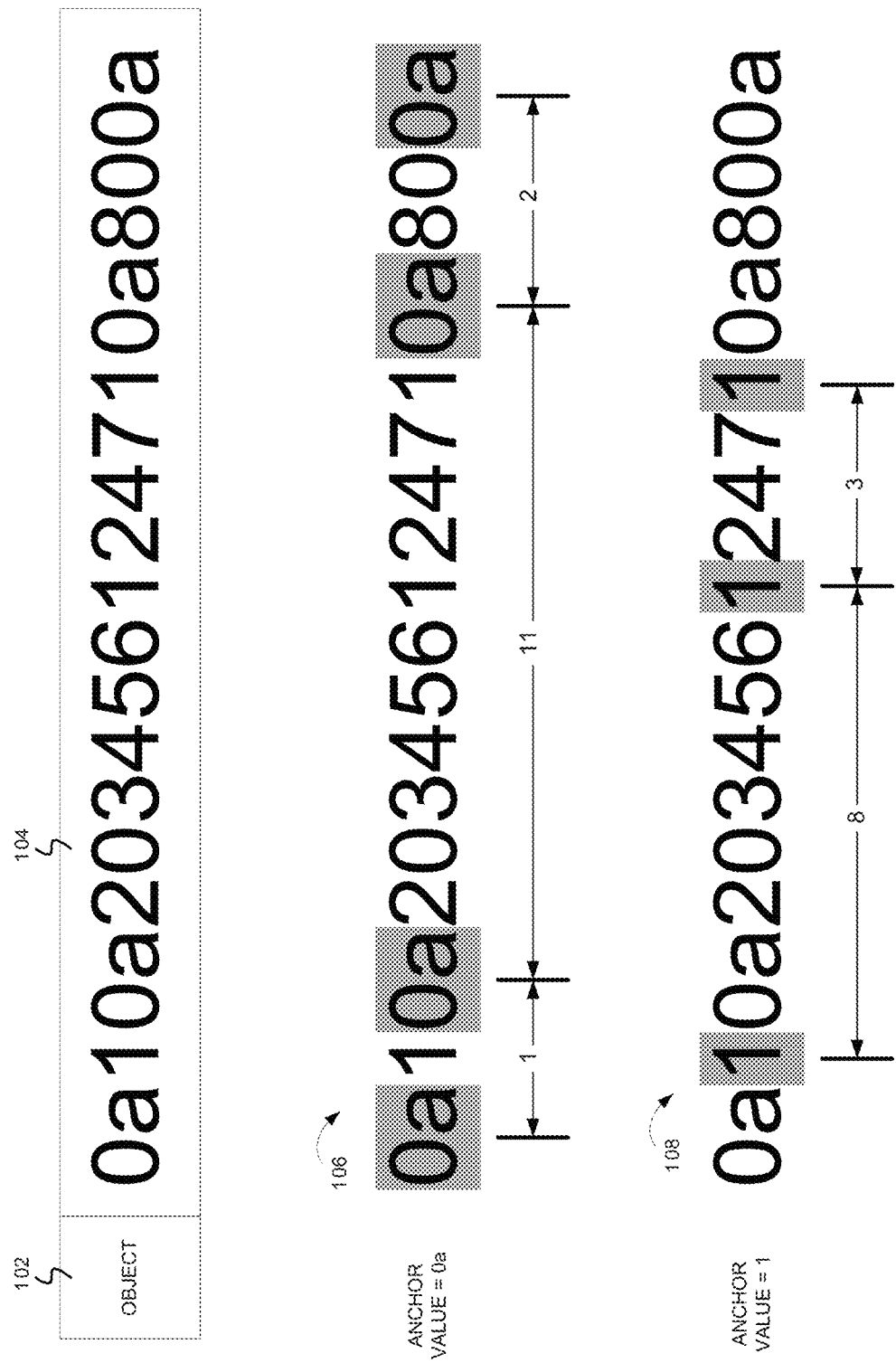
FIG. 1 provides an example data string and illustrates an example of the use of anchors and anchor distances according to embodiments.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

In various aspects of the disclosure, a data similarity fingerprint is generated for an object. The object can be a file, a database record, or other storage unit for data. The data similarity fingerprint can be generated for arbitrary data, and can be used to provide a fixed size similarity fingerprint. The data similarity fingerprint is determined based on anchor values in the object data, and distances between anchor values.

FIG. 1 provides an example data string and illustrates the use of anchor values and distances between anchors values according to embodiments. For purposes of illustrating anchor values and distance, assume that an object 102 has object data 104 comprising a string: "0a10a203456124710a800a." Further assume that two anchor values have been chosen, a first value "0a" and a second value "1." Examples 106 and 108 illustrate anchor values and distances between anchor values. Example 106 comprises the example data string with anchor values "0a" highlighted. As shown in FIG. 1, example 106 has four instances of the anchor value "0a." A distance between anchor values comprises the number of data units between instances of an anchor value. For example, in the case of a string, the number of data units is the number of characters. For binary data, the distance can be the number of bytes between anchor values. In example 106, there is one character between the first instance of anchor value "0a" and the second instance, thus the distance is one (1). The distance between the second instance of the anchor value "0a" and the third instance is eleven (11).

Example 108 comprises the example data string with the anchor values "1" highlighted. As shown in FIG. 1, example 108 has three instance of the anchor value "1", with distances between the anchor values of eight (8) and three (3).

The choice of anchor values and the resulting distances between anchor values can be used to generate coordinates for a data similarity fingerprint. In some aspects, there are N coordinates for a data similarity fingerprint, where N is the number of different anchor values. Typically, N is less than fifty (50). However, the embodiments are not limited to any particular value of N. The value of N can be chosen based on the application of the data similarity fingerprint to a particular problem. For example, a value of N=16 can be used for matching clean files (i.e., clean of malware) such as clean Microsoft Windows binaries. In some aspects, N=30 has been found to produce satisfactory results for matching assorted PE files. A value of N=128 may be useful for assorted files of various types. In some aspects, the coordinates are floating point numbers. However, integer values can also be used. It is desirable that the data similarity fingerprint is designed in a way such that similar objects are close to each other in the L2 (Euclidean) metric. This allows efficient (approximate) algorithms for nearest neighbor searches, for example kd or k-means trees when comparing data similarity fingerprint values to be used.

Figure 2:
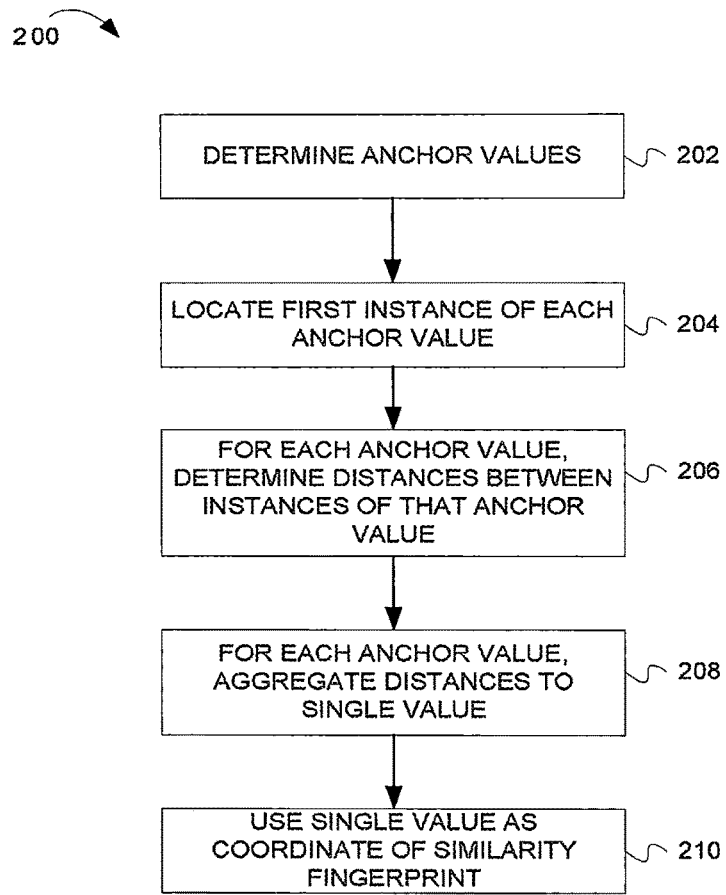
FIG. 2 is a flow chart illustrating exemplary operations of a method for determining a file similarity fingerprint according to embodiments.

Further details on generating a data similarity fingerprint will now be provided with reference to FIG. 2.

FIG. 2 is a flow chart illustrating example operations of a method for determining a data similarity fingerprint according to embodiments. The method is performed by a machine such as that shown in FIG. 4.

At block 202, the anchor values are determined. In some aspects, anchor values are determined according to a specific format of expected object data. For example, a set of anchor values may be chosen for PE (portable executable) files typically found in Android OS environments, while a different set of anchor values may be chosen when the object data comprises IOS executable files. Other types of known data/file formats may be used to determine different sets of anchor values. In other aspects, the set of anchor values may be determined using properties or results of a function applied to the object data. For example, properties of a rolling hash function (e.g., values where at least five bits equal to zero) may be used to determine anchor values. The anchor values may be determined by a machine programmed with the desired anchor values to be used for the various data types or using selected properties or functions applied to the data object.

Figure 4:
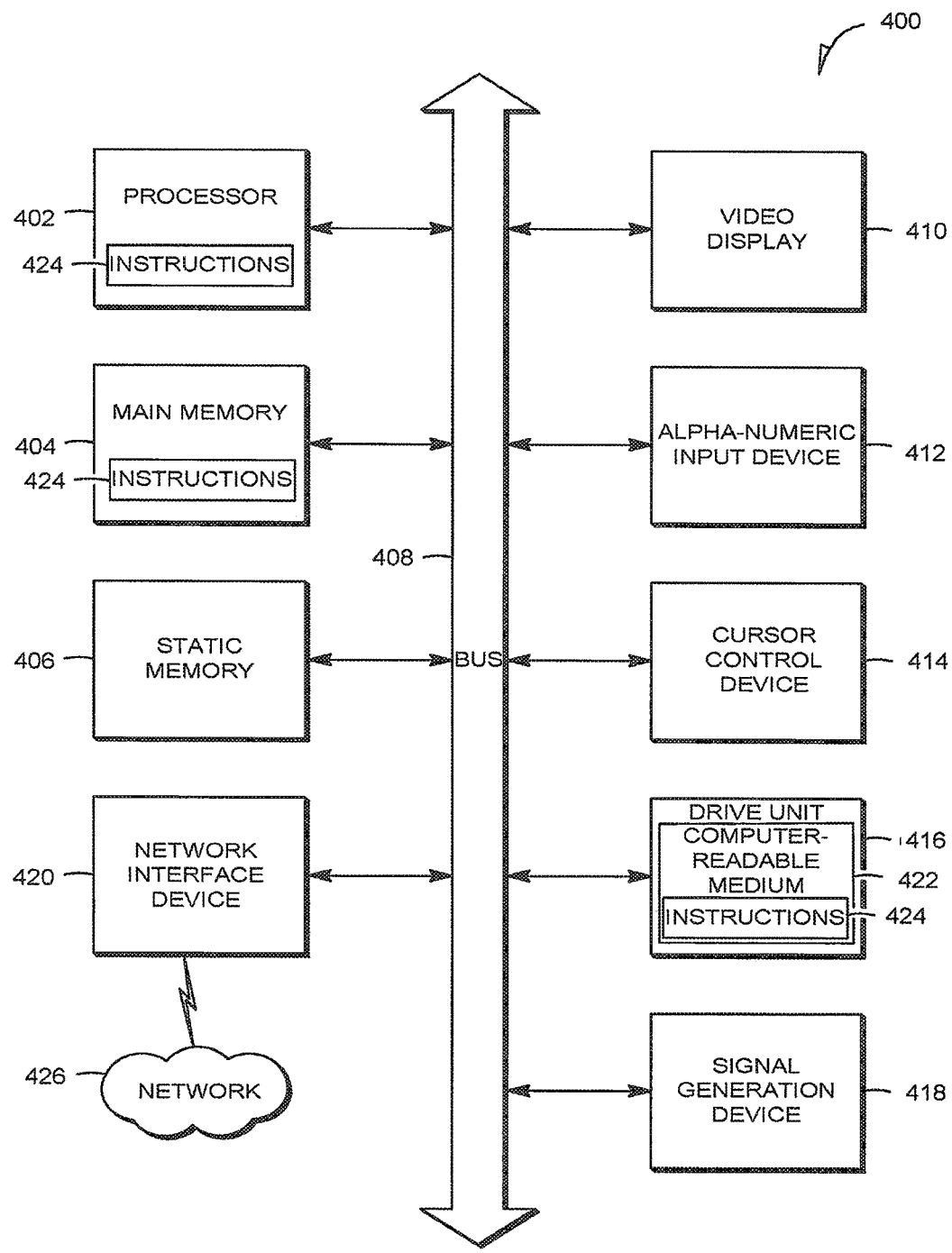
FIG. 4 is a block diagram of an example embodiment of a computer system upon which embodiments of the inventive subject matter can execute.

At block 204, the first instances of the anchor values are located by a computer system (see FIG. 4). In some aspects, the offset (i.e., position from the beginning of the data) of the anchor value can be determined.

At block 206, the distances between the instances of each anchor value is determined.

At block 208, for each anchor value, the distances between each instance of the anchor value is aggregated into a single value which is used as a coordinate. If there are less than two instances of a particular anchor value, zero can be used as a coordinate. In some aspects, the aggregated value may be a mean value of the distances. Alternative aggregation values such as median, Shannon entropy or Gini index may be used. In some aspects, the Shannon entropy can be used for finding similar PE files. The embodiments are not limited to any particular aggregation method. The choice of an aggregation can influence the sensitivity or specificity to different data features of the object data.

At block 210, the coordinates for each anchor value are assembled into a vector representing the data similarity fingerprint.

In the example illustrated in FIG. 1, the object data is the data string "0a10a203456124710a800a," and N equals two. Assume that the mean of the distances is the aggregation function, the first anchor is the string '1' and the second anchor is the string '0a'. Then the coordinate of the first anchor value would be calculated as (8+3)/2. The distance between first instance of the anchor value "1" and the second instance of the anchor value is 8, the distance, the distance between second instance and the third instance of the anchor value "1" is 3. The second coordinate associated with the anchor value "0a" is calculated as (1+11+2)/3. Thus the data similarity fingerprint in the example is using anchor values "1" and "0a" is the vector [5.5, 4.7]

Figure 3:
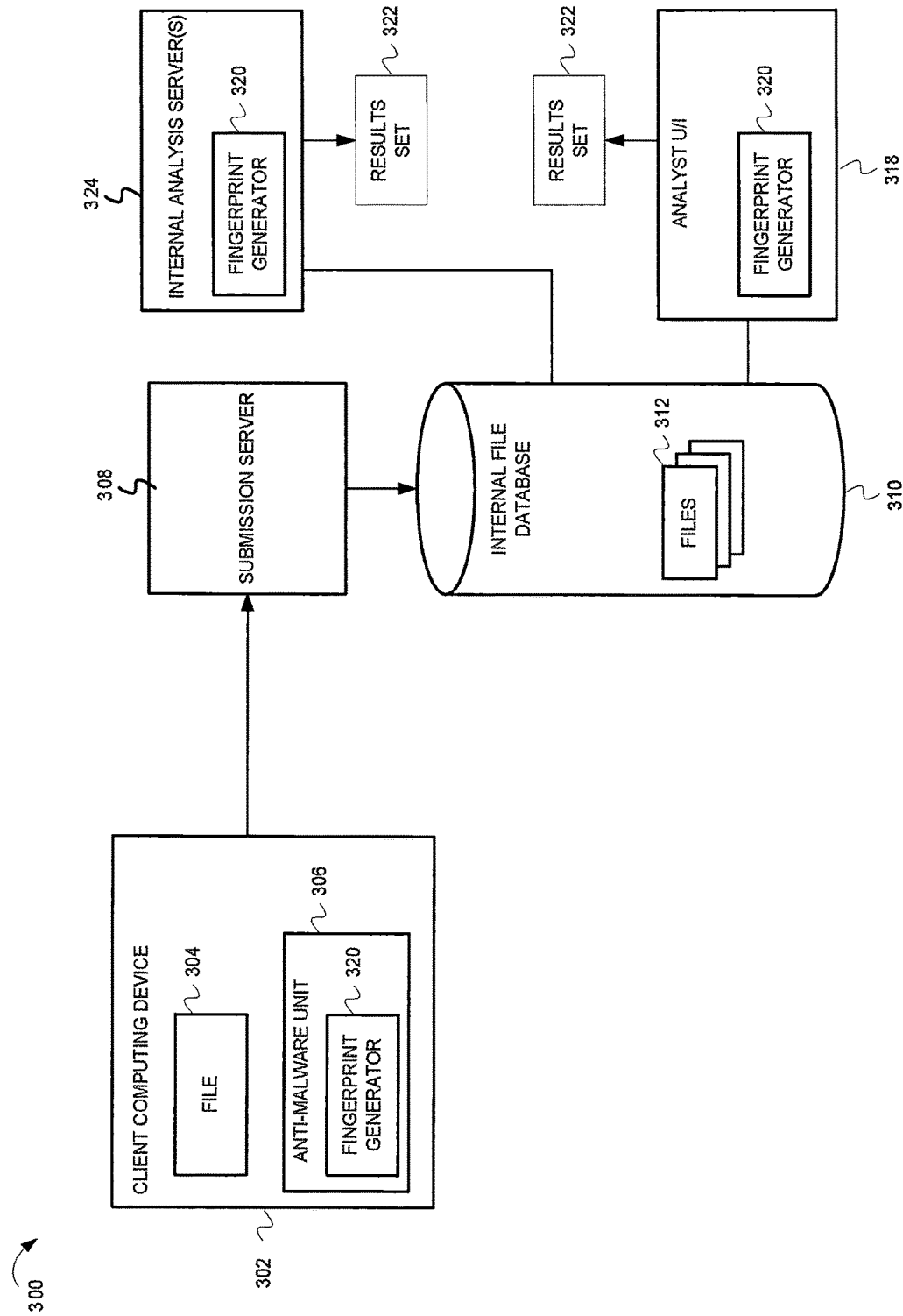
FIG. 3 is a block diagram illustrating an example system utilizing file similarity fingerprints according to embodiments.

FIG. 3 is a block diagram illustrating an example system 300 utilizing file similarity fingerprints according to embodiments. In some embodiments, system 300 includes client computing device 302, submission server 308, internal file database 310, internal analysis server 324, and an analyst user interface (U/I) 318.

Client computing device 302 can be a desktop computer, laptop computer, tablet computer, smart phone, personal digital assistant, media player, set top box, or any other device having one or more processors and memory for executing computer programs. The embodiments are not limited to any particular type of computing device. Client computing device 302 can include an anti-malware unit 306. Anti-malware unit 306 can include one or more of software, firmware or other programmable logic that can detect malicious files. Additionally, anti-malware unit 306 can submit a new file 304 for analysis. The new file may be a file that has not been seen before by the anti-malware unit 306, or may have only been seen on a low number of systems (e.g., the file may be a day one malware source). Anti-malware unit 306 can include a fingerprint generator 320 that generates a data similarity fingerprint as described above. The anti-malware unit can generate a data similarity fingerprint for file 304. The resulting data similarity fingerprint can be compared to fingerprints associated with known malware to determine if the file 304 contains malware, or is suspected of containing malware. In response to determining that the file contains malware, the anti-malware unit can alert the user, quarantine the file 304, and/or remove the mal-ware from the file 304.

In response to determining that the file 304 is suspected of containing malware, client computing device 302 can submit file 304 to submission server 308. Submission server 308 can perform preprocessing on the new file 304 and add the new file to a collection of files 312.

Analyst U/I 318 can provide a user interface for an analyst to access tools that can be used to determine if a file contains malware. The analyst U/I 318 may include a fingerprint generator 320 that can be used to generate a data similarity fingerprint as described above that can be associated with a file under analysis. The generated similarity fingerprint can be compared to fingerprints associated with known malware, or known clean files to aid in determining if a file contains malware.

Internal analysis servers 324 can perform static or dynamic analysis of a file for internal database 310. In some aspects, an internal analysis application can perform a static analysis of a file. For example, the file can be parsed in to components and the components in the file can be analyzed and/or the layout of the file can be stored in internal file database 310. For instance, a PE file can be parsed, and the layout (e.g., number of sections, names of imports etc.) can be stored in the internal file database 310. In other aspects, an internal analysis application can perform a dynamic analysis of the file. The file can be executed in a virtual environment (e.g., a sandbox) and the internal analysis application can observe what happens during the execution of the file (e.g., access to server(s), execution of other processes, writes to disk, writes to registry etc.). Internal analysis server 324 can include a fingerprint generator 320 that can be used to generate a data similarity fingerprint as described above that can be associated with a file under analysis. The generated similarity fingerprint can be compared to fingerprints associated with known malware, or known clean files to aid in determining if a file contains malware.

The analyst U/I 318 and/or the internal analysis server 324 can produce a results set 322. For example, a results set 322 can comprise the N most similar files for a given query and N. The queries can be provided by an analyst via analyst U/I 318 or can be issued by an internal processing automaton.

While the above discussion has been presented in the context of malware detection, those of skill in the art having the benefit of the disclosure will appreciate that the data similarity fingerprint can be useful in other application environments. Such environments can include log file analysis, comparing text or binary files, or other file/data comparison environments. Use of the data similarity fingerprint in these environments are within the scope of the inventive subject matter.

FIG. 4 is a block diagram of an example embodiment of a computer system 400 upon which embodiments of the inventive subject matter can execute. The description of FIG. 4 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As indicated above, the system as disclosed herein can be spread across many physical hosts. Therefore, many systems and sub-systems of FIG. 4 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 4, an example embodiment extends to a machine in the example form of a computer system 400 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 400 may include a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). In example embodiments, the computer system 400 also includes one or more of an alpha-numeric input device 412 (e.g., a keyboard), a user interface (UI) navigation device or cursor control device 414 (e.g., a mouse), a disk drive unit 416, a signal generation device 418 (e.g., a speaker), and a network interface device 420.

The disk drive unit 416 includes a machine-readable medium 422 on which is stored one or more sets of instructions 424 and data structures (e.g., software instructions) embodying or used by any one or more of the methodologies or functions described herein. The instructions 424 may also reside, completely or at least partially, within the main memory 404 or within the processor 402 during execution thereof by the computer system 400, the main memory 404 and the processor 402 also constituting machine-readable media.

While the machine-readable medium 422 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 424 may further be transmitted or received over a communications network 426 using a signal transmission medium via the network interface device 420 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method for automatically determining in a processor a similarity fingerprint for a data object, the method comprising:
   determining a plurality of anchor values in the data of the data object, wherein the plurality of anchor values are different values; and
   for each anchor value in the plurality of different anchor values, the processor automatically determining a set of distances associated with the anchor value, wherein determining the set of distances comprises:
   automatically locating a first instance of the anchor value in the data object,
   for each remaining instance of one or more remaining instances of the anchor value in the data object, the processor automatically determining a distance between the remaining instance and a previous instance of the anchor value in the data object, and including the distance in the set of distances;
   the processor automatically aggregating the set of distances to a single value, wherein the single value is a coordinate for the anchor value, and
   the processor automatically adding the coordinate to a vector representing the similarity fingerprint.

2. The method of claim 1, wherein determining the plurality of anchor values includes determining the plurality of anchor values based, at least in part, on a type of the data object.

3. The method of claim 1, wherein determining the plurality of anchor values includes determining the plurality of anchor values according to a property of a rolling hash function applied to the data object.

4. The method of claim 1, wherein aggregating the set of distances comprises automatically determining one of a median and a mean distance of the set of distances.

5. The method of claim 1 wherein locating the first instance of the anchor value includes automatically determining an offset form a beginning of the data object.

6. The method of claim 1 further comprising comparing the similarity fingerprint to fingerprint associated with known malware to determine if the data object contains malware.

7. The method of claim 1 wherein the aggregating the set of distances comprises automatically determining one of a Shannon entropy and a Gini index of the set of distances.

8. The method of claim 1 wherein determining the plurality of anchor values includes using at least one of properties of the data object and results of a function applied to the object data to perform the determination.

9. A system for automatically determining in a processor a similarity fingerprint for a data object, the system comprising:
   one or more processors; and
   a non-transitory machine-readable medium having instructions stored thereon, that when executed, cause the one or more processors to:
   determine a plurality of anchor values in the data of the data object, wherein the plurality of anchor values are different values; and
   for each anchor value in the plurality of different anchor values, determine a set of distances associated with the anchor value, wherein said determining the set of distances comprises:
   automatically locating a first instance of the anchor value in the data object,
   for each remaining instance of one or more remaining instances of the anchor value in the data object, automatically determining a distance between the remaining instance and a previous instance of the anchor value in the data object, and including the distance in the set of distances;
   automatically aggregating the set of distances to a single value, wherein the single value is a coordinate for the anchor value, and
   automatically adding the coordinate to a vector representing the similarity fingerprint.

10. The system of claim 9, wherein the instructions stored on the non-transitory machine-readable medium that cause the one or more processors to determine the plurality of anchor values include instructions stored on the non-transitory machine-readable medium, that when executed, cause the one or more processors to determine the plurality of anchor values based, at least in part, on a type of the data object.

11. The system of claim 9, wherein the instructions stored on the non-transitory machine-readable medium that cause the one or more processors to determine the plurality of anchor values include instructions stored on the non-transitory machine-readable medium, that when executed, cause the one or more processors to determine the plurality of anchor values according to a property of a rolling hash function applied to the data object.

12. The system of claim 9, wherein said aggregating the set of distances comprises automatically determining one of a median and a mean distance of the set of distances.

13. The system of claim 9, wherein said locating the first instance of the anchor value includes automatically determining an offset form a beginning of the data object.

14. The system of claim 9, wherein the instructions stored on the non-transitory machine-readable medium further comprise instructions stored on the non-transitory machine-readable medium, that when executed, compare the similarity fingerprint to fingerprint associated with known malware to determine if the data object contains malware.

15. The system of claim 9, wherein said aggregating the set of distances comprises automatically determining one of a Shannon entropy and a Gini index of the set of distances.

16. The system of claim 9, wherein the instructions stored on the non-transitory machine-readable medium that cause the one or more processors to determine the plurality of anchor values include instructions stored on the non-transitory machine-readable medium, that when executed, cause the one or more processors to use at least one of properties of the data object and results of a function applied to the object data to perform the determination.

17. A non-transitory machine-readable storage medium having a program stored thereon, the program causing a processor to execute steps for automatically determining a similarity fingerprint for a data object, said steps comprising:
 determining a plurality of anchor values in the data of the data object, wherein the plurality of anchor values are different values; and
 for each anchor value in the plurality of different anchor values, the processor automatically determining a set of distances associated with the anchor value, wherein determining the set of distances comprises:
  automatically locating a first instance of the anchor value in the data object,
  for each remaining instance of one or more remaining instances of the anchor value in the data object, the processor automatically determining a distance between the remaining instance and a previous instance of the anchor value in the data object, and including the distance in the set of distances;
 the processor automatically aggregating the set of distances to a single value, wherein the single value is a coordinate for the anchor value, and
 the processor automatically adding the coordinate to a vector representing the similarity fingerprint.

18. The non-transitory machine-readable storage medium of claim 17, wherein determining the plurality of anchor values includes determining the plurality of anchor values based, at least in part, on a type of the data object.

19. The non-transitory machine-readable storage medium of claim 17, wherein determining the plurality of anchor values includes determining the plurality of anchor values according to a property of a rolling hash function applied to the data object.

20. The non-transitory machine-readable storage medium of claim 17, said steps further comprising comparing the similarity fingerprint to fingerprint associated with known malware to determine if the data object contains malware.

* * * * *